United States Patent [19]

Dickinson

[11] Patent Number: 4,738,050
[45] Date of Patent: Apr. 19, 1988

[54] PLANT AND TREE SUPPORT CLAMP AND SYSTEM

[75] Inventor: Ronald I. Dickinson, Palmetto, Fla.

[73] Assignee: Dickinson' Nursery Products, Inc., Palmetto, Fla.

[21] Appl. No.: 905,854

[22] Filed: Sep. 11, 1986

[51] Int. Cl.⁴ .............................................. A01G 17/06
[52] U.S. Cl. .................................................... 47/43
[58] Field of Search .................... 47/43, 42, 44, 46; 24/17 B, 481, 482, 17 A, 17 B, 17 M, 17 AP, 129 D, 265 CD; 403/354, 398, 399; 248/230, 231

[56] References Cited

U.S. PATENT DOCUMENTS

| | | | |
|---|---|---|---|
| 999,908 | 8/1911 | Tatro | 47/43 |
| 1,517,010 | 11/1924 | Lee | 248/231 |
| 1,854,627 | 4/1932 | Schwerkert | 47/43 |
| 2,137,834 | 11/1938 | Dibner | 403/399 |
| 2,463,116 | 3/1949 | Lewis | 24/129.2 |
| 2,546,159 | 6/1951 | Gottlieb | 24/265 CD |
| 3,791,070 | 2/1974 | Roberts | 47/76 |
| 4,249,716 | 2/1981 | Barron | 248/231 |
| 4,307,540 | 12/1981 | Reisner | 47/43 |

Primary Examiner—Robert A. Hafer
Assistant Examiner—Bradley M. Lewis
Attorney, Agent, or Firm—Charles J. Prescott

[57] ABSTRACT

A clamp and system which incorporates the clamp for laterally supporting the stems of plants and the trunks of small tree saplings. The clamp is attachable to horizontal and vertical support structure such as a post, wire, rod, and larger walls or the like. The clamp has an arcuate body with opposing concave and back surfaces, the concave surface shaped to receive and partially surround a plant stem or tree trunk. Disposed from the back surface or at each end of the arcuate body are a pair of opposing spaced clips adapted to lockably receive an elastic member such as a ring or length of cord. These clips may also serve as retainers for another elastic ring which cushions the plant stem or tree trunk against the concaved surface. The arcuate body includes a mounting post extending from the back surface between the clips having a longitudinal aperture therethrough for receiving a hammered or threaded fastener to be embedded into a suitable support structure so as to secure the body thereto. The system, including the clamp, provides a plurality of means for engagement to a broad range of support structures. Alternate cushioning means are also provided to enhance protection of the supported plant stems and tree trunks, while allowing them to grow and develop relatively uninhibited.

12 Claims, 2 Drawing Sheets

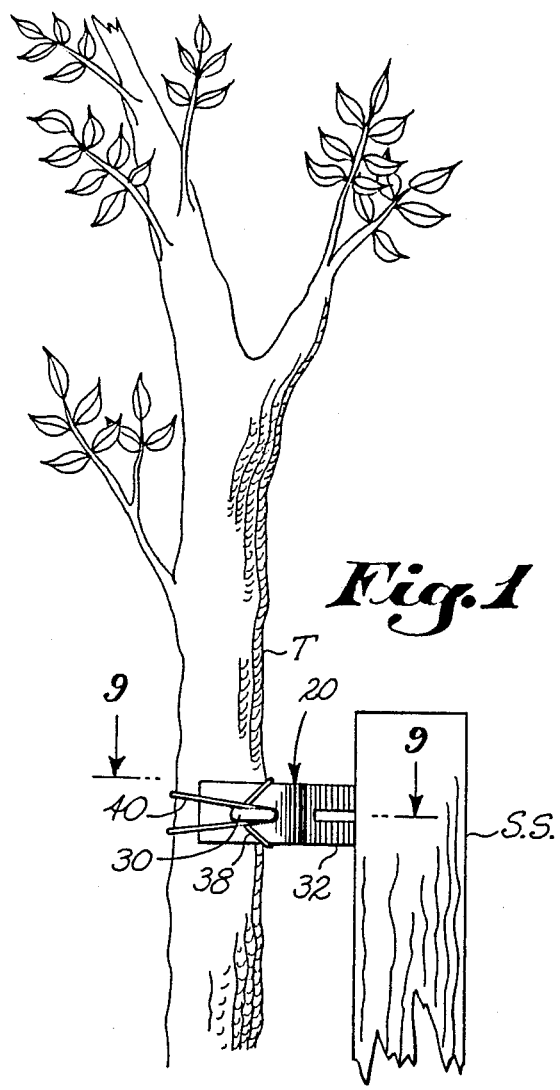
Fig. 1
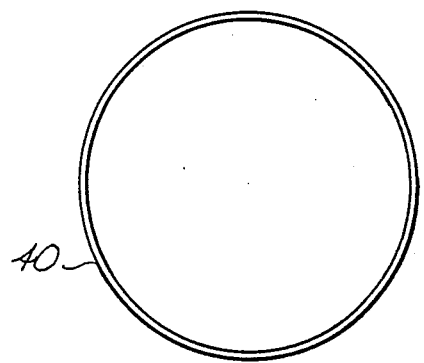
Fig. 2
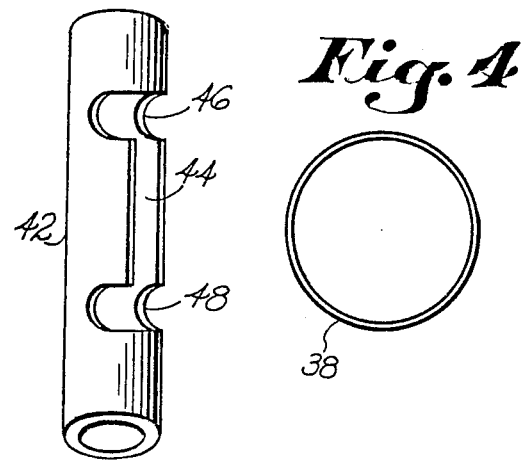
Fig. 3
Fig. 4
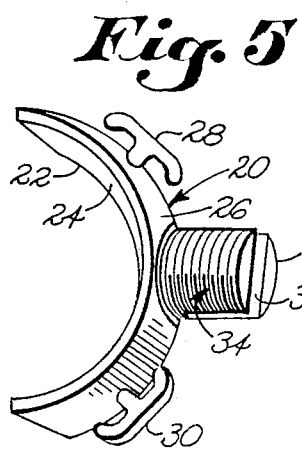
Fig. 5
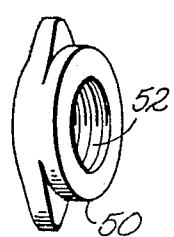
Fig. 6
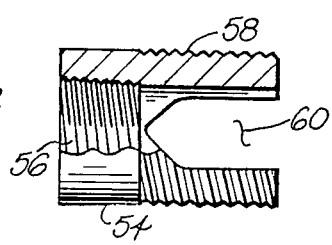
Fig. 7
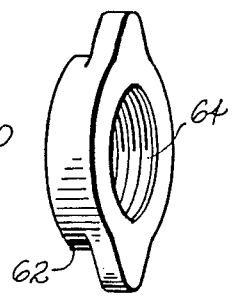
Fig. 8

PLANT AND TREE SUPPORT CLAMP AND SYSTEM

BACKGROUND OF THE INVENTION

This invention relates generally to physical support means for agriculture and more particularly to a support clamp and system for laterally restraining plants or trees in conjunction with supportive structure.

During the preliminary growing process of trees and plants, particularly in nursery settings, the young plant must be supported against wind damage and otherwise maintained in an upright position. The present methods available are generally inadequate in one or more of the functions which are required of such a system or device. One such currently available method of supporting plants and trees directly to supporting structures consists of tying a length of material such as rope, wire, vinyl tape, twine, twist ties or the like around the trunk or main body of the tree or plant and to or around a supportive structure such as a vertical stake or horizontal beam. Some of the disadvantages of this method are that the stem or trunk may become chafed against the supportive structure, "girdling" results when wire or coated wire ties are used, the length of material will typically rot if it is not wire or coated wire, and poorly tied knots in non-metallic materials become loosened or disconnected completely.

When using these lengths of conventional materials in conjunction with a rubber or plastic shielded or coated supportive structures, improper tying will allow the stem or trunk to move laterally along a horizontal support structure such as a tensioned wire resulting in chafing and/or crooked stems or trunks in addition to the above described limitations. Likewise, where the above tying methods and materials are used in conjunction with even a cushioned support structure, the above limitations apply.

The present invention is intended for use in conjunction with supportive structures to keep containerized and newly planted trees and plants from being damaged due to wind by either being blown or weighted down or chafed or scuffed either against the supportive structure or the interconnecting support means therebetween. This invention is capable of being firmly affixed to a broad variety of horizontal or vertical support structures such as wire, cable, reinforcing rod, wood or metal beams or stakes and the like. Additionally, the present invention is reusable as in a nursery environment for virtually an unlimited length of time. This invention is also of sufficient physical strength to withstand virtually all mechanical wind loads and, additionally, is resistant to ozone, UV light, a broad range of temperature extremes and virtually all agricultural chemicals. The present invention also provides a plant and tree clamp system which virtually eliminates all of the above disadvantages, and, additionally, provides a broad range of interconnection means to support structures of virtually every type known to applicant. Various alternates are also provided to cushion and protect the stem or trunk from chafing and girdling.

BRIEF SUMMARY OF THE INVENTION

This invention is directed to a clamp, and system which incorporates the clamp, for laterally supporting the stems of plants and the trunks of small tree saplings. The clamp is attachable to either vertical or horizontal support structures such as a post, wire, rod, tubing and larger walls or the like. The clamp has an arcuate body with opposing concave and back surfaces, the concave surface shaped to receive and partially surround a plant stem or tree trunk. Disposed from the back surface or at each end of the arcuate body are a pair of opposing spaced clips adapted to lockably receive an elastic member such as a ring or length of cord. These clips may also serve as retainers for another elastic ring which cushions the plant stem or tree trunk against the concaved surface. The arcuate body includes a mounting post extending from the back surface between the clips having a longitudinal aperture therethrough for receiving a hammered or threaded fastener to be embedded into a suitable support structure so as to secure the clamp thereto. The system, including the clamp, provides a plurality of means for engagement to a broad range of support structures. Alternate cushioning means are also provided to enhance protection of the supported plant stems and tree trunks, while allowing them to grow and develop relatively uninhibited.

It is therefore an object of this invention to provide a plant and tree support clamp which is attachable to a support structure and which, when used in conjunction with an elastic member such as a ring or cord, provides full 360 degree lateral support for plants and small trees.

It is another object of this invention to provide the above device in conjunction with protective cushion means between its concave body surface and the supported plant or tree.

It is another object of this invention to provide the above clamp in reusable form.

It is another object of this invention to provide a system, including the above clamp, having additional adaptive structure and components to facilitate engagement to a broad variety of both vertical and horizontal support structures.

It is another object of this invention to provide the above system having alternate cushion means.

It is another object of this invention to provide the above system including multi-purpose clips for interengagement to the elastic retaining member as a ring and one embodiment of the cushioning means.

In accordance with these and other objects which will become apparent hereinafter, the instant invention will now be described with reference to the accompanying drawings in which:

BRIEF DESCRIPTION OF THE DRAWINGS

FIG. 1 is a side elevation view of one embodiment of the invention shown supporting a small tree sapling.

FIG. 2 is a top plan view of an elastic retaining ring used to partially surround the plant stem or tree trunk to be supported.

FIG. 3 is a perspective view of one embodiment of the cushion means.

FIG. 4 is a top plan view of an elastic ring used as another embodiment of the cushion means.

FIG. 5 is a perspective view of the preferred embodiment of the clamp.

FIG. 6 is a perspective view of a first jam nut threadably engageable over the mounting post extending from the clamp shown in FIG. 5.

FIG. 7 is a broken section side elevation view of a slotted adaptor threadably engageable over the mounting post as shown in FIG. 5.

FIG. 8 is a perspective view of a second jam nut threadably engageable over the external threads of the slotted adaptor shown in FIG. 7.

DETAILED DESCRIPTION OF THE INVENTION

Figure 9:
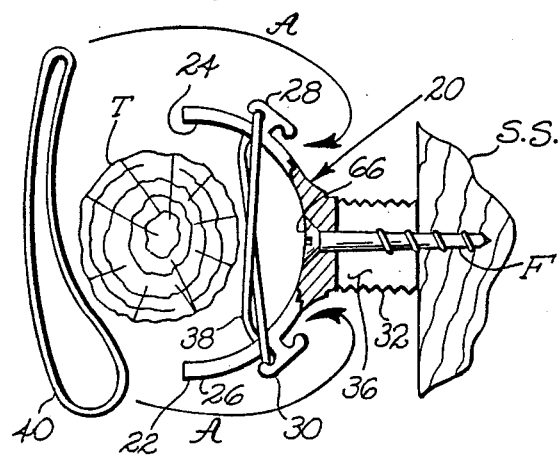
FIG. 9 is a section view in the direction of arrows 9—9 in FIG. 1 before assembly.

Referring now to the drawings, and particularly to FIGS. 1, 2, 4, 5 and 9, the clamp of the invention is shown generally at numeral 20 and includes an arcuate body 22 having a concave surface 24 and a back surface 26. Disposed outwardly from the back surface is a mounting post 32 having external threads 34 and a longitudinal slot 36 extending from the distal end of the mounting post 32 generally toward the back surface 26 and may terminate adjacent or at the back surface 26. Also disposed outwardly from the back surface 26 are a pair of clips 28 and 30 generally having a T-shape as shown. Note that, based upon the functioning of these clips 28 and 30 as herebelow described, they may also be positioned at or adjacent the ends of the arcuate body 22 and be within the scope of this invention.

The invention generally provides a plurality of attaching means to various support structures such as the vertical wooden stake S.S. as shown in FIGS. 1 and 9, to accommodate virtually any horizontally or vertically disposed support structure. As depicted in FIGS. 1 and 9, the support structure S.S. is a vertically disposed wooden stake or post embedded into the ground. The clamp 20 is first fastened to the post by a threaded wood fastener F which passes through and is secured within an axially disposed aperture 66 through the central portion of the arcuate body 22 and the mounting post 32. The plant stem or tree sapling T which is intended to be supported is then placed within the concave surface 24 and without further additions, will effectively support the tree T through a portion of a complete circle around the tree T. However, because this invention is intended to support such plants and trees from wind forces in all directions, the clamp 20, providing clips 28 and 30, is now ready to receive an elastic retaining member 40 in the form of a retaining ring 40 as best seen in FIG. 2. The retaining ring 40 is first placed around the one clip 28, and then stretched around the remaining unsurrounded portion of the tree T to the other clip 30 wherein it is fastened.

An optional and preferred addition to the system of the invention, including the clamp 20, is in the form of a cushioning means to prevent the tree T from contacting the concave surface 24. This is preferred because the clamp 20 is mold formed of relatively rigid plastic. One embodiment of the cushioning means is in the form of an elastic ring 38 as best seen in FIG. 4. The multi-function clips 28 and 30 are also adapted to receive and retain the cushion ring 38 as best seen in FIG. 9. To enhance the effectiveness of this cushion ring 38, it is recommended that at least one twist be placed within the cushion ring 38 before fastening it to the second clip, either 28 or 30, before the retaining ring 40 is stretched in position around the tree T fastened at either end onto clips 28 and 30.

Figure 10:
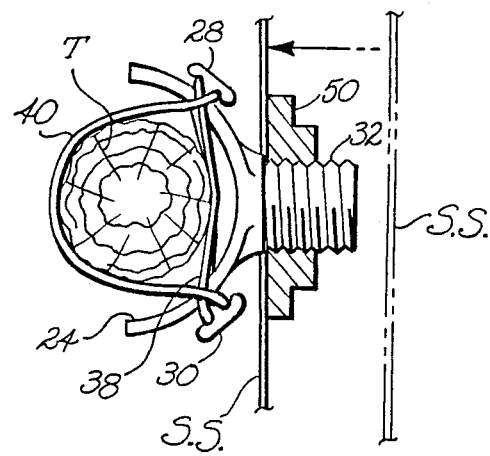
FIG. 10 is a section view similar to FIG. 9 assembled, except wherein the support structure is a tensioned length of wire held by the first jam nut shown in FIG. 6.

Referring now also to FIGS. 6 and 10, another support structure which is typically encountered in nurserys and elsewhere is a tensioned horizontal length of wire SS' as a support structure. This type of wire SS' is typically of smaller diameter and, therefore, axial slot 36 as best seen in FIG. 5 is provided of sufficient width to receive such wire support structures SS'. Thereafter, to retain the clamp 20 in position so as to subsequently supportively receive the tree T as previously described, a first jam nut 50 is provided having internal threads 52 which mate over the external threads 34 of mounting post 32. By this means, then, the wire support structure S.S. is trapped and clamped within the mounting slot 36 and against the bottom of same by tightening jam nut 50.

Figure 11:
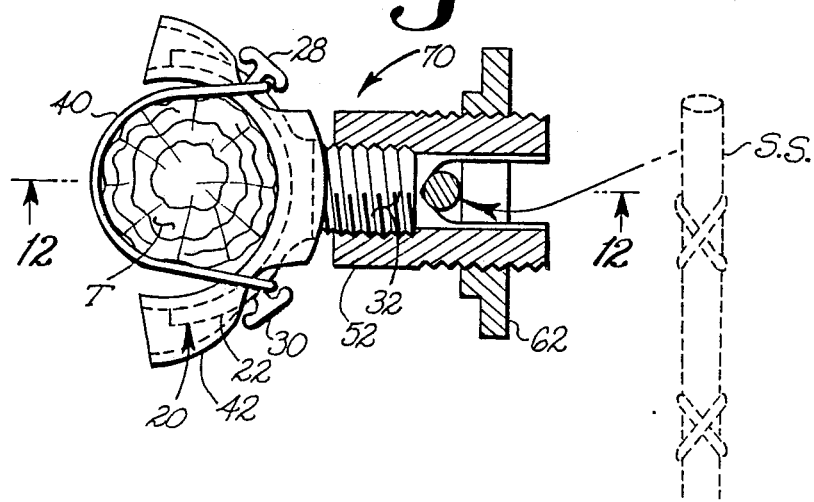
FIG. 11 is a section view similar to FIG. 10, including the components of FIGS. 7 and 8 and wherein the support structure is an enlarged upright reinforcing rod embedded into the ground and depicting an alternate embodiment of the cushioning means shown in FIG. 3.

Referring now to FIG. 11, one embodiment of the system is shown generally at numeral 70 and includes one embodiment of all of the components of the system 70 of the invention. Here, the support structure SS' is a larger diameter reinforcing rod which is typically embedded into the ground in a nursery setting for support. To accommodate this larger diameter, a slotted adaptor 54 is also provided having internal threads 56 which mate onto the external threads 34 of mounting post 32. The slotted adaptor 54 also has external threads 58 and a slot 60 extending from one end part way through the slotted adaptor 54 as shown in FIG. 7. The second jam nut 62 as shown in FIG. 8 includes internal threads 64 which mate over the external threads 58 of slotted adaptor 54. By this arrangement, then, the slotted adaptor 54 may be threadably secured over the mounting post 32, whereafter the reinforcing rod support structure SS" is placed within slot 60 and lockably secured there by jam nut 62.

Figure 12:
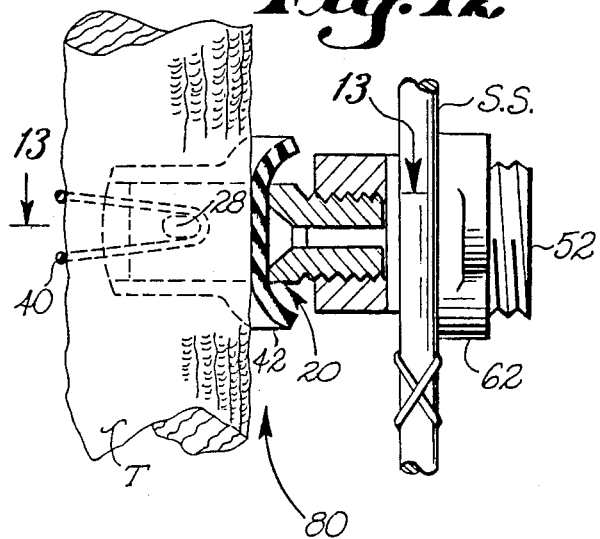
FIG. 12 is a section view in the direction of arrows 12—12 in FIG. 11.
Figure 13:
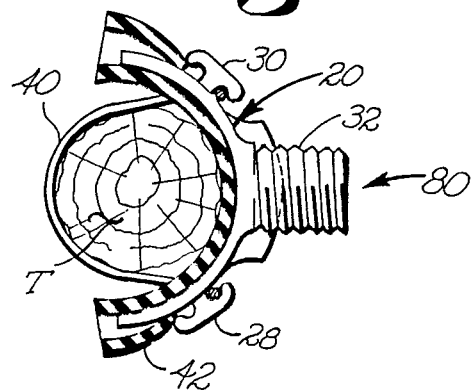
FIG. 13 is a section view in the direction of arrows 13—13 in FIG. 12.

Referring additionally to FIGS. 3, 12 and 13, an alternate and preferred embodiment of the cushioning means is shown at 42 in conjunction with the system 80, made of a length of flexible tubing or hose and having a longitudinal slit 44 formed within the mid-portion of the tubular cushioning means 42. The longitudinal slit 44 is preferrably shaped having enlargements at 46 and 48 at either end of slit 44 which facilitate manipulating the tubular cushioning means 42 onto the arcuate body 22 and into position as shown in FIGS. 11 and 12. By this means, then, the tubular cushioning means 42 covers the entire concave surface 24 against contact with the tree T. Retaining ring 40 is also utilized in the system to provide lateral support to the portion of the tree T unsurrounded by clamp 20.

Note that although at least one embodiment of the cushioning means is preferred; where the tree T has sufficient size or surface toughness, such cushioning means may be eliminated. Note further that the invention may be marketed in the form of the clamp 20 alone wherein the user will provide elastic retaining members in lieu of retaining ring 40 in the form of rubber bands or the like or, simply a length of elastic cord. The retaining member utilized should, however, have a degree of elasticity to prevent injury or girdling to the tree T. An alternate way of marketing the invention is by providing a system, including all of the components hereabove described, in a complete package. An intermediate marketing program would envision providing each of the components separately and in quantities determined based upon the need of the user.

Althouth the preferred embodiments of the cushion means are hereabove described, alternates may be provided within the scope of this invention such as cellular foam tape adhered to the concave surface of the clamp 20. Additionally, the concave surface, although a curvilinear shape is preferred, may also be V-shaped, rectangular or irregular.

While the instant invention is shown and described herein in what is conceived to be the most practical and preferred embodiment, it is recognized that departures may be made therefrom within the scope of this invention, which is therefore not to be limited to the details disclosed herein, but is to be accorded the full scope of the claims so as to embrace any and all equivalent apparatus and articles.

I claim:

1. A plant and tree support system to be used in conjunction with a support structure comprising:
   a clamp having an elongated arcuate body having opposing concave and back surfaces, said concave surface adapted to partially surround plant stems and relatively small tree trunks to be supported;
   said clamp having a mounting post extending from said back surface;
   said clamp having two opposing clips outwardly disposed from said back surface on either side of said mounting post;
   said clips having an outwardly extending leg portion with an enlarged portion at the distal end thereof, whereby an elastic retaining member placed over said enlarged portion will tend to remain on said leg portion;
   said mounting post having an axially disposed aperture therethrough to receive a fastener for attaching said body to a support structure cushioning means connectable to said body for preventing contact of said concave surface with the plant stem or tree trunk to be supported; said cushioning means is an elastic member shaped as a continuous ring connectable between said clips for preventing contact of said concave surface with the plant stem or tree trunk to be supported.

2. A plant and tree support system as set forth in claim 1, further including:
   a length of flexibe tubing having a longitudinal slit disposed along a mid-portion of said tubing adapted to enable said tubing to be manipulated onto said arcuate body such that said concave surface is substantially covered by said tubing.

3. A plant and tree support system as set forth in claim 1, further comprising:
   a longitudinal slot in said mounting post extending from the distal end of said post toward said back surface;
   said mounting post having external threads;
   a first jam nut mateable over said mounting post external threads;
   said mounting post slot adapted to receive relatively smaller diameter wire and rods serving as support structure;
   said first jam nut for lockably securing said clamp in relation to wire and rod placed within said mounting post slot.

4. A plant and tree support system as set forth in claim 3, further comprising:
   an adapter having an axially disposed slot extending from one end to the mid-portion of said adaptor;
   said adaptor having external threads extending generally along said adaptor slot;
   said adaptor also having axially extending internal threads mateable over said mounting post external threads;
   a second jam nut mateable over said adaptor external threads;
   said adaptor slot shaped to receive relatively larger diameter wire and rods serving as a support structure;
   said second jam nut for lockably securing said body in relation to wire and rod placed within said adaptor slot.

5. A plant and tree support system to be attachable to a support structure comprising;
   a clamp having an elongated arcuate body having opposing concave and back surfaces, said concave surface adapted to partially surround plant stems and relatively small tree trunks to be supported;
   said clamp having a mounting post extending from said back surface;
   said clamp having two opposing clips disposed from said back surface on either side of said mounting post;
   said mounting post having an axially disposed aperture therethrough to receive a fastener for attaching said body to a support structure;
   cushioning means connectable to said body for preventing contact of said concave surface with the plant stem or tree trunk to be supported;
   an elastic retaining member for interengagement with said clips after said elastic retaining member has been stretched around the portion of the supported stem or tree trunk otherwise unsurrounded by said concave surface;
   a longitudinal slot in said mounting post extending from the distal end of said mounting post toward said back surface;
   said mounting post having external threads;
   a first jam nut mateable over said mounting post external threads;
   said mounting post slot adapted to receive relatively small diameter wire and rods serving as a support structure;
   said first jam nut for lockably securing said body in relation to smaller diameter rod and wire placed within said mounting post slot;
   an adaptor having an axially disposed slot extending from one end to the mid-portion of said adaptor;
   said adaptor having external threads extending along said adaptor slot;
   said adaptor also having an axially extending internal thread mateable over said mounting post external threads;
   a second jam nut mateable over said adaptor external threads;
   said adaptor slot shaped to receive relatively larger diameter wire and rod serving as a support structure;
   said second jam nut for lockably securing said body in relation to larger diameter wire and rod placed within said adaptor slot.

6. A plant and tree support system as set forth in claim 5, wherein:

said cushioning means is an elastic ring.

7. A plant and tree support system as set forth in claim 5, wherein:
said cushioning means is a length of flexible tubing having a longitudinal slit disposed along the mid-portion of said tubing adapted to enable said tubing to be manipulated onto said arcuate body such that said concave surface is substantially covered by said tubing.

8. A plant and tree support system as set forth in claim 5, wherein:
said cushioning means is a length of compressible tape adhered to said concave surface.

9. A plant and tree support system as set forth in claim 5, wherein:
said concave surface is curvilinear.

10. A plant and tree support system as set forth in claim 5, wherein:
said concave surface is v-shaped.

11. A plant and tree support system as set forth in claim 5, wherein:
said concave surface is rectangular.

12. A plant and tree support system as set forth in claim 5, wherein:
said elastic retaining member is an elastic ring.

* * * * *